July 17, 1956  P. B. WEISZ  2,755,388
METHOD FOR DETECTING HYDROCARBON GAS
Filed Dec. 12, 1951  2 Sheets-Sheet 1
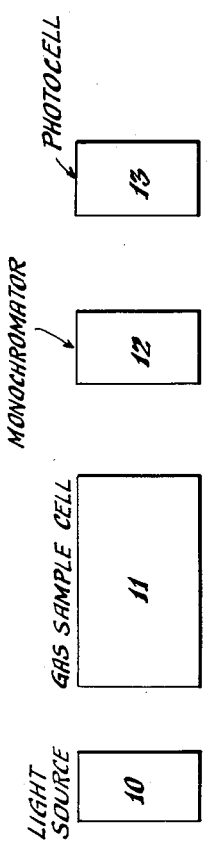
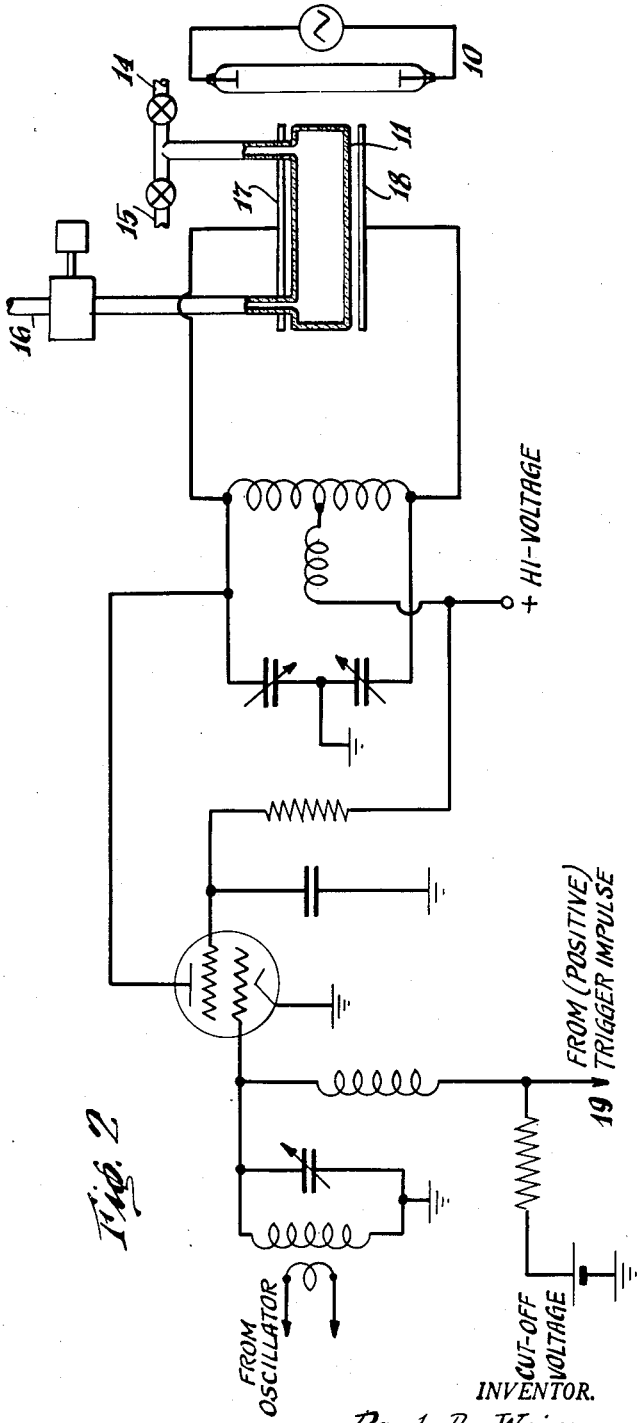
INVENTOR.
Paul B. Weisz
BY
ATTORNEY

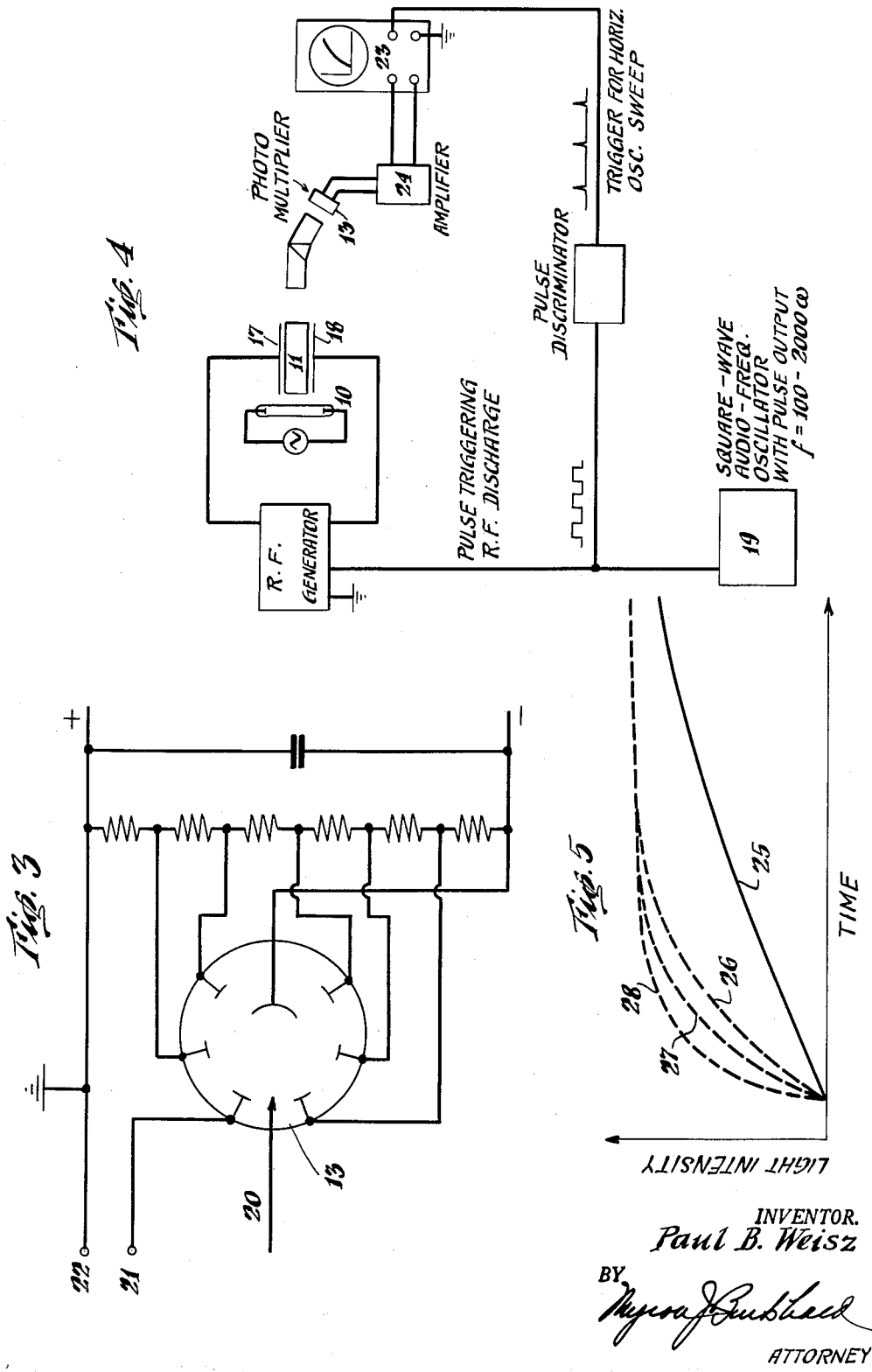

United States Patent Office 2,755,388
Patented July 17, 1956

2,755,388
METHOD FOR DETECTING HYDROCARBON GAS

Paul B. Weisz, Pitman, N. J., assignor to Socony Mobil Oil Company, Inc., a corporation of New York Application December 12, 1951, Serial No. 261,346

3 Claims. (Cl. 250—43.5)

This invention has to do with the detection of small amounts of hydrocarbons in gas samples containing the same.

In exploration for oil, one method which has received attention is that of collecting soil-gas samples from a series of points distributed in a pattern across the area under examination, followed by analysis of these soil-gas samples for hydrocarbons in an attempt to determine whether or not the area examined has an underlying oil deposit. While many refinements of technique have been worked out in the collection of samples, and their proper correlation with the possible underground deposits, one point of trouble has been the analysis of the samples. Classical methods of analysis have been applied with difficulty. Most methods of suitable accuracy have been "bench" methods, adaptable for application only in a laboratory, usually at some distance from the point of sample collection. Relatively few methods have been developed showing any promise for use at or near the site of sample collection. The most desirable method is one which can be expressed in apparatus combining high portability and accuracy, together with ruggedness, in order that the soil-gas analysis could be conducted in the field, thus avoiding all of the inherent difficulties such as contamination, loss, and others arising from a method which requires taking of samples in the field, transportation to a laboratory, and probably intervening storage prior to analysis.

This invention is directed to a method for such analysis and to an apparatus for accomplishing such method.

It is further directed to a method for the analysis of soil-gas samples for hydrocarbons capable not only of detecting hydrocarbons but also of differentiating between methane, ethane, and higher hydrocarbons.

It has for an object the use of certain photo electronic phenomena for the identification of ethane and heavier hydrocarbons in gas samples.

It has for another object the provision of an apparatus capable of being used for such detection and determination of hydrocarbons in gases by utilizing such photo electronic phenomena.

One major object is the provision of an apparatus capable of being reduced to portability while maintaining accuracy, and adaptable to field as well as to laboratory use.

Other objects and advantages of the present invention would become apparent from the following detailed description when considered with the drawings in which:

Figure 1 is a block diagram of the apparatus of the instant invention;

Figure 2 is a schematic wiring diagram;

Figure 3 is a schematic diagram of a photo multiplier circuit;

Figure 4 is a schematic diagram of the entire system of the instant invention; and Figure 5 is a group of curves which have been plotted with light intensity as ordinates and time as abscissa.

This invention is based upon the utilization of knowledge of the ionization potentials of hydrocarbon gases and the relation of these ionization potentials to certain photo electric effects associated with gas discharges.

It is well known that under proper conditions, photo-excitation of gases can be obtained by passing light of selected characteristics through the gases. It is equally well known that certain atoms subjected to electronic excitation will rise into states of electronic excitation which are referred to as metastable states. The normally excited or non-metastable states will ordinarily spontaneously drop to a state of lower potential energy by the emission of light quanta. The metastable states are ordinarily not de-excited by a process of light quanta emission, but instead will be brought to the ground state by kinetic processes such as collisions which are capable of removing the excess energy of de-excitation. Such collisions may be effected by the presence of small "impurities" of proper electronic excitation levels.

Among those atomic species which are known to possess specific metastable states are the rare gases, mercury, cadmium, zinc, and a few others.

In connection with the present invention the rare gas, argon is particularly of interest. This atomic species is known to possess metastable states which are located as follows: $M_1 = 11.72$ e. v. and $M_2 = 11.54$ e. v. It is known that these metastable states can be produced and considerable concentration maintained for fractions of a second by such procedure as passing a discharge through the gas space. It is also known that the presence of small amounts of impurities present in the gas space will act to "quench" these metastable states if the impurity molecules have electronic excitation levels which are below the value of $M_1$ and $M_2$. Preferably such "quenching" impurity should have an electronic excitation level which is lower than but nearly equal to $M_2$.

Turning to the electronic excitation properties of hydrocarbons it is noted that the ionization potential of propane and hydrocarbons of larger mass are below $M_1$ and $M_2$. Some such values are:

*Table I*

| Compound: | I. P. |
|---|---|
| $C_3H_8$ | 11.22±.02 e. v. |
| $C_4H_{10}$ | 10.80±.02 e. v. |

The ionization potential of ethane has been determined as 11.71±.03 e. v., and recently, indirect evidence has been obtained that it is probably somewhat lower, which would give it a value lower than $M_1 = 11.72$ e. v., the higher metastable state for argon.

Here then is a mechanism by which the presence of hydrocarbons of higher molecular weight than methane may be detected. When hydrocarbons of $C_2$ or higher are found in the presence of the metastable argon states, those metastable states will find an outlet for their potential energy in ionizing the hydrocarbon molecules, leading to rapid de-excitation of the metastable states. Methane, carbon monoxide, carbon dioxide, hydrogen, water, nitrogen, oxygen, i. e., other atomic species present or likely to be found in soil gas have ionization potentials much higher and could not so act.

This invention has for its basic object the provision of a method of analyzing soil gas or soil gas extracts for the detection of hydrocarbons of carbon number of two and greater by admixing the soil gas or soil gas extract and a volume of pure argon, exciting metastable states of argon in the mixed gas volume, and observing the rate of decay of metastable argon concentration upon removal of the source of excitation.

A convenient way of accomplishing this is by means of the apparatus shown in block diagram form in Figure 1. In this figure there is shown a light source 10, which is an argon discharge. Light from this discharge passes into a cell 11 containing the mixed argon and soil gas. Light emergent from cell 11 is passed through a monochromator 12 which is set to a light wavelength characteristic of a spectral transition between the metastable level and the next higher energy level in the argon atom. Light passed by the monochromator then passes to the photo detector 13, which may be a photo-multiplier, photocell, etc.

From the argon discharge, light is emitted characteristic of the transition of the various excited states of argon down to and including the metastable states. This light passes into the gas cell, through which a discharge is passed either by the use of built in electrodes or by an externally applied radio frequency field for a short interval of time. The light from 10, passing through the gas in 11, will have portions of its spectrum "reabsorbed" by the metastable argon states which are by this action raised to the corresponding excited state.

Consequently the amount of light of this selected portion of the spectrum which passes through the gas cell is a measure of the amount of the metastable argon atoms present. Immediately upon the removal of the electrical discharge the concentration of metastable argon is at a maximum, and the light of this frequency which is passed is at a minimum. As the metastable state concentration decreases, as a function of time, the intensity of selected light passed increases. In the absence of impurity (in the sense used herein), a rate of increase of light quanta of the selected frequency passed through may be established as a "blank" or base relationship for the system under examination. Now if there be present an impurity, i. e., some material which may provide, by collision processes, a more rapid decay of the concentration of the metastable state, the rate of disappearance by reason of this impurity will be added to the rate of disappearance due to natural causes, and the rate of increase of light of the selected frequency passed through the gas cell after removal of the ionizing potential will be greater. The monochromator 12 is set to pass this characteristic wave length. The photo detector 13 is utilized to observe the rate of this intensity increase after the removal of the discharge in the gas cell 11.

The separate portions of the apparatus used for this detection are largely conventional in type.

The light source 10, for example will be a glass tube, fitted with electrodes and filled with argon gas. Convenient conditions are that the argon should be at a pressure of 10 mm. mercury absolute, and an appropriate exciting voltage for this pressure would be of the order of 10,000 volts.

The gas cell 11 is most conveniently formed as a glass cylinder, with plane ends, parallel to each other, the cylinder being connected to an evacuator and having controlled inlets for argon and for the gas sample to be tested.

Such a gas cell is shown in Figure 2, which in diagram form, sets forth both the cylinder and a wiring system appropriate for its operation.

In Figure 2 we find light source 10 and gas cell 11 which is equipped with sample inlet 14, argon inlet 15, and connected to evacuator 16. The gas cell is preferably operated at a pressure of about 10 cm. absolute and is subjected to electrical excitation at a voltage appropriate to the pressure obtaining within, for example, at 10 cm. pressure, absolute, an appropriate voltage is from 1000 to 5000 volts. While internal electrodes can be used, in well known manner, it is preferred to use radio frequency excitation, thus avoiding any side effects that might arise from internal electrodes. In the drawing of Figure 2, this excitation is applied by external electrodes 17 and 18, excited by an oscillator of conventional type, except that the excitation circuit is provided with a pulsing device at 19 which is arranged to make and break at and for some predetermined time interval, synchronized with the circuits which record the course of light absorption in the gas cell 11.

The monochromator may be any standard form of instrument capable of being set to pass only light of the selected wave length. For example, it may be an instrument such as the Beckman spectrophotometer. These instruments usually consist essentially of a conventional prism spectrometer adjustable to select a desired wave length of light.

In the present case, the wave lengths of light in which we are interested, that is, those associated with the presence of argon atoms in metastable states are as follows:

Metastable I _____ 7948 A.
Metastable II _____ 7635 or 8115 A.

The photo detector is preferably a conventional photomultiplier, such as, for example, that shown in highly diagrammatic form in Figure 3, wherein light entering at 20 gives rise to an electrical impulse emergent at terminals 21 and 22.

The remainder of the circuit consists preferably of an oscilloscope, again largely conventional, so arranged that its horizontal sweep is synchronized with the breaking of the excitation of the gas cell 11 by device 19 and so that its vertical sweep is controlled by the electrical impulse emergent from the photo-multiplier 13 at terminals 21 and 22.

This is shown diagrammatically in Figure 4, wherein a portion of Figure 2 and a simplification of Figure 3 is included. In Figure 4, we have the gas tube 11, the excitation circuit acting upon it through electrodes 17 and 18, with the cut off device 19 in said circuit, such as a square wave video frequency oscillator, utilized in known fashion. The cutting off of the excitation is arranged to initiate the horizontal sweep of the oscilloscope 23, by use of a pulse discriminator in known manner. Light entering photo-multiplier 13 gives rise to current which is amplified at 24 and fed to the vertical sweep of the oscilloscope 23.

The type of curves derived from the oscilloscope are are shown in Figure 5, wherein intensity of light passed through the gas cell is the vertical ordinate and time is the horizontal ordinate. With no "impurity" present, the rate of recovery to full-pass intensity (i. e., the "blank" of the determination), will be some curve such as the full line 25. With an impurity, such as a detectable hydrocarbon present, the rate of recovery will be higher, such as at dotted line 26. With varying amounts of "impurity" present, a family of curves, 26, 27, 28 may be developed, each corresponding to a different amount of "impurity."

Turning now to the detection of hydrocarbons, the gas charge to the gas cell is a mixture of argon and preferably of gaseous extract of the sample to be inspected. Under these conditions, significant changes in the rate of recovery of light transmission would be effected by 1 part of hydrocarbon in $10^7$ parts of gas cell content. It is of course obvious that the sensitivity could be varied by variations of the conditions of operation selected, for the gas cell. Also it is quite obvious that there are methods of treating the sample to increase the concentration of hydrocarbon therein, as by fractionation, selective adsorption, and the like, applicable to produce an extract or concentrate of the original soil gas sample, although in many cases it may be used without such concentration.

It will be observed that the method is applicable not only to the detection of hydrocarbons of 2 or more carbon atoms but also to the detection of any polyatomic material having an ionization potential equal to or less than 11.72 e. v., that of the metastable I state of argon. For example, in appropriate surroundings, the set-up could be used for the detection of minute amounts of gasoline vapors, natural gas, and/or other vapors of organic chemicals.

Turning to the oscilloscope trace, it will be noted that increasing amounts of hydrocarbons will give rates of recovery which are more rapid. From this it follows that the method may be made quantative to a fair accuracy by the expedient of determining rate of recovery curves for known mixtures and comparing them with the curve derived from examination of the sample.

It is also quite obvious that the shape of the curve may be modified, for example, expanded in time, or in other ways for desired changes in readability and the like, by making known modifications in the electronic circuits. Also, other instrumentation capable of reporting the rate of recovery of light transmission versus time may be used such as utilization of the total integrated light received by the photo-electric detector in an interval corresponding to the recovery of light transmission through the absorption cell. All of these modifications are deemed to be within the scope of this invention.

I claim:

1. A method for the detection of hydrocarbons in a soil gas sample which comprises subjecting a mixture of argon and a soil gas sample to electrical excitation to give rise to metastable states of argon, discontinuing excitation of the argon, and observing the rate of disappearance of the metastable states of argon in the presence of the soil gas sample in comparison with the rate of disappearance of the metastable states of argon under conditions similar except for the absence of the soil gas sample.

2. A method for the detection of hydrocarbons in a soil gas sample which comprises subjecting a mixture of argon and a soil gas sample to electrical excitation to give rise to metastable states of argon, discontinuing excitation of the argon while passing through the said mixture light quanta of frequency capable of being absorbed by the metastable states of argon and observing the rate of disappearance of the metastable states of argon in the presence of the soil gas sample in comparison with the rate of disappearance of the metastable states of argon under conditions similar except for the absence of the soil gas sample.

3. A method for the detection of hydrocarbons in a soil gas sample which comprises subjecting a mixture of argon and a soil gas sample to electrical excitation to give rise to metastable states of argon, discontinuing excitation of the argon while passing through the said mixture light quanta of frequency capable of being absorbed by the metastable states of argon and observing the rate of disappearance of the metastable states of argon in the presence of the soil gas sample in comparison with the rate of disappearance of the metastable states of argon under conditions similar except for the absence of the soil gas sample by measuring the rate of change of transmission through the said mixture of the said light after the said excitation is discontinued.

References Cited in the file of this patent

UNITED STATES PATENTS

| | | |
|---|---|---|
| 1,519,555 | Ruben | Dec. 16, 1924 |
| 2,437,323 | Heigl et al. | Mar. 9, 1948 |
| 2,509,649 | Norman | May 30, 1950 |
| 2,561,802 | Klug | July 24, 1951 |